3,000,750
PROCESS OF PREPARING DISPERSIONS OF PULVERULENT MATERIAL AND PREPARATIONS OBTAINED THEREBY
Günter Felletschin, Dusseldorf-Wersten, Germany, assignor to Dehydag, Deutsche Hydrierwerke G.m.b.H., Dusseldorf, Germany, a corporation of Germany
No Drawing. Filed Mar. 2, 1954, Ser. No. 413,697
Claims priority, application Germany Mar. 6, 1953
13 Claims. (Cl. 106—308)

This invention relates to surface-treated pulverulent materials and to a process of preparing dispersions of pulverulent materials, and to preparations obtained thereby.

In many technical processes and products, pulverulent materials are added in finely divided form to liquid, highly viscous, plastic, or solid substances, in order to produce special effects, such as color effects, greater opacity, hazing, blushing, clouding, or turbidifying effects, filler effects and the like. It is often difficult to uniformly and intimately distribute such pulverulent materials throughout such liquid, highly viscous, plastic, or solid vehicles and media, such as paints, lacquers and varnishes, rubber compositions, plastics, compositions for making artificial textile fibers, films, foils, and the like articles, and difficult to retain such pulverulent materials in suspension in the liquid vehicle. Uniform and intimate dispersion of such pulverulent materials throughout the medium or vehicle, however, is of the utmost importance for the production of satisfactory compositions and preparations containing such pulverulent materials and continued uniform suspension of the pulverulent material in the vehicle is also important.

It is one object of this invention to provide a simple and effective process of finely and uniformly distributing pulverulent materials throughout liquid, highly viscous, plastic, or solid vehicles and media.

Another object of this invention is to provide a process which considerably increases the suspension characteristics of pulverulent materials in liquid, highly viscous, or plastic vehicles and media and of stabilizing the resulting suspensions.

Another object of this invention is to provide a pulverulent material of increased dispersibility and wettability in liquid, highly viscous, or plastic vehicles and media.

Various other objects and advantages of my invention will be come apparent as this description proceeds.

I have discovered that if the pulverulent materials to be used as additives in many technical preparations and compositions as mentioned above are subject to a treatment and impregnation with salts of acid phosphoric acid esters of higher molecular weight alcohols or phenols, such impregnation treatment considerably increases the wettability of said pulverulent materials and their dispersibility in liquid, highly viscous, or plastic media or vehicles. Said treatment, at the same time, substantially increases the suspension capacity of said pulverulent materials in such liquid and other vehicles, and the stability of suspensions thereof in such liquid media or vehicles. Furthermore, the use of pulverulent materials subjected to a preliminary treatment according to my invention, in many instances considerably improves the entire structure and strength properties of the resulting final products.

The use of pulverulent materials treated and impregnated according to the present invention as additives to lacquers, paints, rubber and latex base paints, varnishes and the like, provides a great improvement in these paints, lacquers and the like, because they can be very readily incorporated into the vehicle and have excellent suspension characteristics.

Such impregnated pulverulent materials are also of special importance as filler materials in compounding compositions of natural or synthetic rubber, reclaimed rubber, and rubber substitutes because they are not only more readily wettable and dispersed therein, but they impart to such rubber compositions also remarkable improved structural properties, such as increased strength, greater elongation and the like.

Pulverulent materials to be used according to my invention can be of inorganic as well as organic nature. For instance, inorganic oxides, hydroxides and salts, as they are used as pigments or fillers in lacquers, paints or varnishes, such as ocher, minium, ferric oxide, titanium dioxide, zinc sulfide, barium sulfate, calcium carbonate, metal powders, for instance, metal bronzes, fillers for rubber and reclaimed rubber compositions, such as carbon black, zinc oxide, finely dispersed silicon dioxide, silicagel, calcium silicate, aluminum silicate, and the like, may be improved in their wettability and dispersibility by a treatment according to the present invention. Other pulverulent materials which may be impregnated according to the process of this invention are, for instance, powder bases, such as talc, rice flour, starch and the like. Bleaching earth, pumice powder, kaolin, alumina, activated carbon, cork flour, wood flour, shell flour and other inorganic and organic pulverulent materials are also well suited for said treatment.

In the practice of my invention, said pulverulent materials are impregnated with salts of inorganic or organic bases with acid phosphoric acid esters derived from higher molecular weight alcohols or phenols. The term "higher molecular weight alcohols or phenols" comprises aliphatic, cycloaliphatic, aromatic, aliphatic-aromatic, or cycloaliphatic-aromatic hydroxyl compounds containing at least six carbon atoms in their molecule. Examples of such alcohols and phenols are hexanol, octanol, dodecanol, oleyl alcohol, cyclohexanol, alkyl cyclohexanols, naphthalene alcohols, benzyl alcohol, naphthyl-methyl alcohols, tetrahydronaphtyl-methyl alcohols, phenols, naphthols, their alkylation products, and the like.

Salts of said acid phosphoric acid esters may be formed with various bases, such as alkali hydroxides, alkaline earth hydroxides, ammonia, acyclic and cyclic organic bases, such as dibutylamine, octylamine, trialkanolamines, cyclohexylamine, dialkylcyclohexylamine, and the like. Said salts of acid phosphoric acid esters suitable for use according to my invention may be prepared according to known processes.

Mixtures of different phosphoric acid esters of the kind decribed as well as mixtures of different salts of such esters, for instance, mixtures of salts derived from ammonia or organic gases, respectively, and alkaline earth metal hydroxides or earth metal hydroxides, respectively, may also be used.

The pulverulent materials are impregnated with said salts of acid phosphoric acid esters by adding said pulverulent materials to solutions or suspensions of said salts in aqueous or organic media while stirring, decanting, filtering off, or centrifuging the treated pulverulent materials, and subsequently drying the same. For certain uses, drying of the treated pulverulent material may not be necessary. One may also impregnate dry pulverulent material by spraying or atomizing with solutions of said salts, preferably while stirring. In some cases it is possible to directly grind or mix the salts with the pulverulent materials in a pan grinder. Thereby, both components may be employed in the dry as well as the moist state.

The amounts of said salts with which the pulverulent materails are impregnated are dependent upon the working conditions and upon the purpose for which the pulverulent materials are to be used. In general, amounts of between 0.02% and 10% and preferably of between 0.1% and 5% of the pulverulent material are used. Higher amounts may also be added, although, usually, they will not cause any substantial further improvement of the properties of said pulverulent materials.

Subsequently to said impregnation, the pulverulent materials are incorporated in the usual manner into liquid, highly viscous, or plastic media or vehicles. Such incorporation may be carried out at ordinary temperatures or at elevated temperature, depending upon the medium or vehicle used. Working at elevated temperature will be required especially when using solid, but fusible, thermoplastic or thermosetting moldable media or vehicles. The treated pulverulent filler is incorporated in said media by means of known technical means, such as agitators, grinding mills, masticators, kneading mills, pan grinders, edge mills, oscillating ball mills, colloid mills, and the like apparatus, and the milling is continued until a satisfactory degree of dispersion is achieved.

I have also found that it is not always necessary to impregnate the pulverulent material with said salts of acid phosphoric acid esters before adding said pulverulent material to the corresponding medium. According to another embodiment of my invention, the same advantageous results are obtained by adding said salts of acid phosphoric acid esters with alcohols or phenols, to the vehicle or medium and then mixing the pulverulent material therein. Said salts may also be added to the medium or vehicle during or even after incorporation of said pulverulent material.

The process and product of my invention have proven very useful in the production of pigment containing compositions. In addition to the improvement of the surface properties of said pigments, their spreading or covering power, and likewise their yield value on use, is considerably increased. Their state of dispersion in such products is stabilized and the properties of such pigment containing products made according to my invention are remarkably improved.

The following examples serve to illustrate the invention without, however, limiting the same thereto:

*Example 1*

300 parts by weight of red ferric oxide (colcothar) are milled in a ball mill with 5 parts by weight of the cyclohexyl amine salt of a mixture of acid phosphoric acid alkyl esters, the alkyl residues thereof having 12 to 18 carbon atoms, until said salt is homogeneously distributed throughout said pigment. The phosphoric acid ester is obtained by reacting phosphorous pentoxide with a mixture of fatty alcohols having 12 to 18 carbon atoms, and neutralizing the resulting product with cyclohexyl amine. The impregnated pigment is finely ground in and triturated with a resin ester-linseed oil lacquer in the proportion of 30 parts of pigment to 70 parts of lacquer. The resulting lacquer shows excellent stability on storage. Even after several months, only an insignificant amount of pigment settles out, and the sediment is readily re-dispersed in the lacquer.

*Example 2*

100 parts by weight of a highly dispersed silicagel are impregnated with 1.5% of the triethanolamine salt of an acid dodecyl tetrahydronaphthyl-methyl phosphoric acid ester. 90 parts by weight of said impregnated silicagel are compounded and masticated in the customary manner with 150 parts by weight of crepe rubber, 4.5 parts by weight of zinc oxide, 4.5 parts by weight of sulfur, and 1.5 parts by weight of mercapto benzothiazole disulfide. The resulting rubber composition is vulcanized.

The pre-treated silicagel can be much more readily compounded with said rubber mixture than untreated material and the resulting vulcanized articles have much better strength properties in use than when compounded with untreated silicagel.

*Example 3*

0.5 part by weight of the dimethyl cyclohexylamine salt of a mixture of acid mono- and dioleyl phosphoric acid esters are dissolved in 100 parts by weight of a linseed oil lacquer while gently heating. 30 parts by weight of yellow ocher are added thereto while grinding and mixing in a hopper mill. The pigment can be very readily incorporated into said lacquer which even after storage for several months, does not show any firmly adhering sediment.

While I have described certain embodiments of my invention, it will be understood that various modifications and changes may be made in the examples given and that various pulverulent materials not herein specifically listed may be treated according to the spirit of my invention and within the scope of the following claims.

I claim:

1. In a process of producing stable dispersions of pulverulent materials in liquid to plastic organic vehicles, used in paint compositions, rubber compositions and plastic compositions, the steps comprising impregnating said pulverulent material with a salt of an acid phosphoric acid ester of aliphatic hydrocarbon alcohols containing from 8 to 18 carbon atoms and dispersing said impregnated pulverulent material in said organic vehicles.

2. In a process of producing stable dispersions of pulverulent materials in liquid to plastic organic vehicles used in paint compositions, rubber compositions and plastic compositions, the steps comprising adding to and distributing throughout said organic vehicle a salt of an acid phosphoric acid ester of aliphatic hydrocarbon alcohols containing from 8 to 18 carbon atoms and dispersing the pulverulent material in said vehicle.

3. In a process of producing stable dispersions of pulverulent materials in liquid to plastic organic vehicles used in paint compositions, rubber compositions and plastic compositions, the step comprising dispersing the pulverulent material and, simultaneously, a salt of an acid phosphoric acid ester of aliphatic hydrocarbon alcohols containing from 8 to 18 carbon atoms in said organic vehicle.

4. In a process of producing stable dispersions of pulverulent materials in liquid to plastic organic vehicles used in paint compositions, rubber compositions and plastic compositions, the steps comprising dispersing the pulverulent material in said organic vehicle and admixing to the resulting dispersion a salt of an acid phosphoric acid ester of aliphatic hydrocarbon alcohols containing from 8 to 18 carbon atoms.

5. In a process of producing stable dispersions of pulverulent material in said organic vehicles in the presence used in paint compositions, rubber compositions and plastic compositions, the step comprising dispersing said pulverulent materal in said organic vehicles in the presence of a salt of an acid phosphoric acid ester of aliphatic hydrocarbon alcohols containing from 8 to 18 carbon atoms.

6. As a product of manufacture, pulverulent material suspendable in liquid to plastic organic vehicles used in paint compositions, rubber compositions and plastic compositions and impregnated with a salt of an acid phosphoric acid ester of aliphatic hydrocarbon alcohols containing from 8 to 18 carbon atoms.

7. As a product of manufacture, dry pulverulent material suspendable in liquid to plastic organic vehicles used in paint compositions, rubber compositions and plastic compositions and having a coating of a salt of an acid phosphoric acid ester of aliphatic hydrocarbon alcohols containing from 8 to 18 carbon atoms, on the particles of said pulverulent material.

8. Dry pulverulent material of improved wettability and dispersibility in liquid to plastic organic vehicles used in paint compositions, rubber compositions and plastic compositions impregnated with a salt of an acid phosphoric acid ester of aliphatic hydrocarbon alcohols containing from 8 to 18 carbon atoms in an amount between 0.02% and 10% of said material.

9. Pulverulent material of improved wettability and dispersibility in liquid to plastic organic vehicles used in paint compositions, rubber compositions and plastic compositions impregnated with a salt of an acid phosphoric acid ester of aliphatic hydrocarbon alcohols containing from 8 to 18 carbon atoms in an amount between 0.1% and 5.0% of said material.

10. A rubber composition of improved strength properties having finely dispersed therein a pulverulent filler materal and a salt of an acid phosphoric acid ester of aliphatic hydrocarbon alcohols containing from 8 to 18 carbon atoms.

11. A pulverulent mineral pigment of improved wettability and dispersibility in liquid to plastic organic vehicles used in paint compositions, rubber compositions and plastic compositions impregnated with the cyclohexylamine salt of a mixture of acid phosphoric acid esters of a mixture of fatty alcohols having 12 to 18 carbon atoms in their molecule.

12. A pulverulent mineral pigment of improved wettability and dispersibility in liquid to plastic organic vehicles used in paint compositions, rubber compositions and plastic compositions, impregnated with the dimethyl cyclohexylamine salt of a mixture of acid mono- and di-phosphoric acid esters of oleyl alcohol.

13. Pulverulent material of improved wettability and dispersibility in liquid to plastic organic vehicles used in paint compositions, rubber compositions and plastic compositions having, on the particles thereof, a salt of an acid phosphoric acid ester with an aliphatic hydrocarbon alcohol having 8 to 18 carbon atoms.

References Cited in the file of this patent

UNITED STATES PATENTS

| | | |
|---|---|---|
| 2,219,050 | Mikeska | Oct. 22, 1940 |
| 2,230,353 | Kern | Feb. 4, 1941 |
| 2,282,006 | Sloan | May 5, 1942 |
| 2,296,066 | Sloan | Sept. 15, 1942 |
| 2,357,573 | Beck | Sept. 5, 1944 |
| 2,509,664 | Amon et al. | May 30, 1950 |
| 2,578,605 | Sears et al. | Dec. 11, 1951 |
| 2,656,372 | Ernst et al. | Oct. 20, 1953 |
| 2,719,010 | Erickson | Sept. 27, 1955 |

FOREIGN PATENTS

| | | |
|---|---|---|
| 560,916 | Germany | Dec. 6, 1928 |

OTHER REFERENCES

Schwartz et al.: "Surface Active Agents" (1949), page 361.

---

UNITED STATES PATENT OFFICE

CERTIFICATE OF CORRECTION

Patent No. 3,000,750               September 19, 1961

Günter Felletschin

It is hereby certified that error appears in the above numbered patent requiring correction and that the said Letters Patent should read as corrected below.

Column 3, line 8, for "temperatures" read -- temperature --; column 4, line 52, for "material in said organic vehicles in the presence" read -- materials in liquid to plastic organic vehicles --; column 5, line 13, for "materal" read -- material --.

Signed and sealed this 13th day of February 1962.

(SEAL)
Attest:

ERNEST W. SWIDER                    DAVID L. LADD
Attesting Officer                     Commissioner of Patents

UNITED STATES PATENT OFFICE
CERTIFICATE OF CORRECTION

Patent No. 3,000,750                        September 19, 1961

Günter Felletschin

It is hereby certified that error appears in the above numbered patent requiring correction and that the said Letters Patent should read as corrected below.

Column 3, line 8, for "temperatures" read -- temperature --; column 4, line 52, for "material in said organic vehicles in the presence" read -- materials in liquid to plastic organic vehicles --; column 5, line 13, for "materal" read -- material --.

Signed and sealed this 13th day of February 1962.

(SEAL)
Attest:

ERNEST W. SWIDER                          DAVID L. LADD
Attesting Officer                            Commissioner of Patents